UNITED STATES PATENT OFFICE.

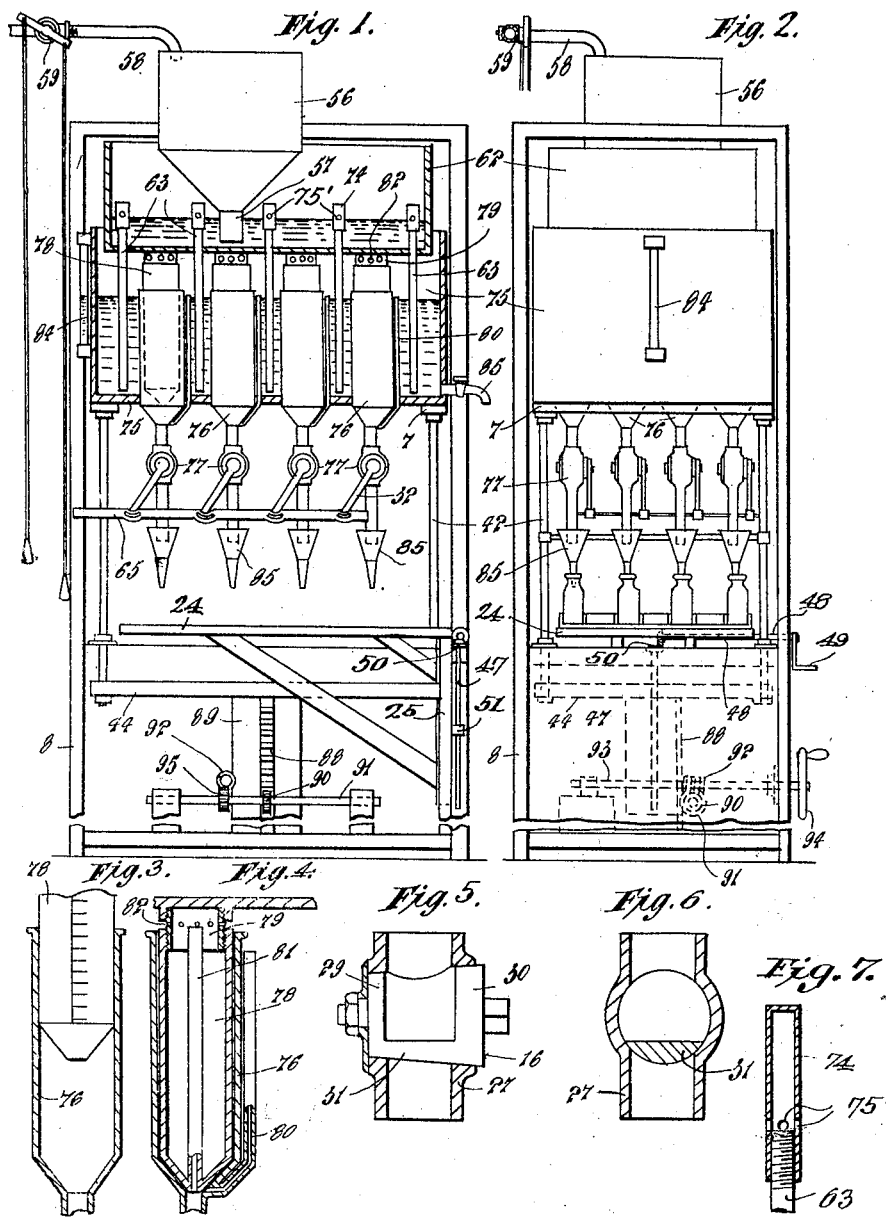
E. J. FALKINER.
RECEPTACLE FILLING AND MEASURING MACHINE.
APPLICATION FILED NOV. 25, 1916.
1,333,299. Patented Mar. 9, 1920.
Inventor
Edward John Falkiner
BY: [signature]
ATTORNEY

EDWARD J. FALKINER, OF WELLINGTON, NEW ZEALAND.

RECEPTACLE-FILLING AND MEASURING MACHINE.

1,333,299. Specification of Letters Patent. Patented Mar. 9, 1920.

Original application filed July 22, 1915, Serial No. 41,282. Divided and this application filed November 25, 1916. Serial No. 133,344.

*To all whom it may concern:*

Be it known that I, EDWARD JOHN FALKINER, of No. 2 Walter street, in the city of Wellington, New Zealand, a subject of the King of Great Britain and Ireland, residing at Wellington, New Zealand, have invented a new and useful Improvement in Receptacle Filling and Measuring Machines; and I do hereby declare the following to be a full, clear, and exact description of the same.

This invention relates to that class of apparatus for filling receptacles with liquid wherein a measured quantity of liquid may be delivered to a receptacle.

The object of the invention is to construct an apparatus that will be simple and by means of which the same quantity of liquid will pass to each receptacle and turbulence and froth will be prevented as such liquid passes to the measuring vessel or vessels.

A chamber is provided with a funnel or funnels depending therein to near the bottom thereof. Pipes lead from this chamber at a desired height from the bottom of said chamber and depend into a movable chamber located below said first chamber. This movable chamber is mounted upon a slidable frame.

Measuring vessels are located within this movable chamber, their lower ends communicating with and controlled by taps.

By this arrangement liquid is made to flow into the bottom of an already charged chamber the head of liquid in the chamber causing the liquid to flow steadily and evenly into the chamber thereby preventing the turbulence of any kind in the incoming liquid.

In the case of fermented liquids this is very important since no second fermentation must be set up.

The invention will be described in detail by means of the accompanying drawings wherein:—

Figure 1 is a side elevation partly in section of a machine having adjustable measuring devices.

Fig. 2 is a front elevation thereof.

Fig. 3 is a view partly in section.

Fig. 4 is a sectional view of a measuring device.

Fig. 5 is a longitudinal section of a preferred form of tap.

Fig. 6 is a cross section thereof.

Fig. 7 is a sectional view of a detail.

Referring to the drawings a vessel 56 is provided with a funnel shaped discharge 57. Into this vessel 56 a pipe 58 from the source of supply leads and is controlled by a tap 59. The delivery end of the vessel 56 depends into a receiving chamber 62 to near the bottom thereof.

Pipes 63 lead from this chamber at a desired height from the bottom of said chamber and depend into the movable chamber 75 mounted upon the slidable frame 7. Mounted in the bottom of this chamber 75 are liquid measuring compartments 76 having their delivery ends controlled by taps 77 having their plugs connected to common operating arms 65 by means of arms 32. Funnels 85 are arranged below the discharge openings of the taps.

The pipes 63 are provided with an adjustable regulator (see Fig. 7) and consists of a cylindrical cover 74 provided with openings 75' disposed in the same horizontal line around its circumference. By screwing the regulator up or down the area of the openings 75' is increased or decreased. Thus the amount flowing into each pipe may be uniformly regulated.

Depending from the chamber 62 are plungers 78 adjustable upon threaded members 79 projecting from the under side of the chamber 62. These plungers telescope and slide within the measuring compartments 76 and the holding capacity of the compartments is governed by the position of the said plungers therein. Feed ducts 80 lead from the bottom of the compartments 76 to within a desired distance from the top thereof as shown.

An air outlet pipe 81 is provided in each of the plungers (see Fig. 4) and air within the compartment 76 escapes through this pipe and out through outlet orifices 82 in the member 79 as the liquid flows into the compartment.

When the frame 7 is raised to its highest position the measuring compartments will contain the minimum amount of liquid as will be appreciated upon examination of Fig. 4 the only holding capacity being in the duct 80, pipe 81 and the space between the bottom of the plunger and the tap 77.

Fig. 3 shows that the measuring compartments have been lowered considerably and the holding capacity thereby proportionately increased. It will be clearly seen that by adjusting the frame 7 any required quantity of liquid may be obtained in the measuring compartments from the minimum to the maximum.

By means of the plungers 78 being threaded upon the members 79 they are capable of very fine adjustment thus insuring that all the compartments can be adjusted to exactly the same capacity.

In operation the liquid is allowed to flow from the source of supply to the vessel 56 whence it flows through the pipes 63 to the chamber 75 and through the feed ducts 80 into the measuring vessels 76. Since the liquid level in the chamber 62 will never fall below the height of the pipes 63 and since the liquid flows into the chamber 62 at the bottom thereof the level of the liquid in the vessel rises uniformly over its whole area. The liquid will also flow evenly into the pipes 63.

The head of liquid between the bottom of the chamber 62 and the top of the pipes 63 causes the liquid to flow steadily and evenly into the vessel 62 thereby preventing turbulence of any kind in the incoming liquid. Foam upon the surface of the liquid in the measuring chamber is also obviated.

When the desired liquid level has been reached within the chamber 75 observable by means of a gage 84 upon the vessel 75, the supply is cut off by operating the cock 59.

The level of the liquid in the vessel 75 is then lowered by means of the cock 85 until it is slightly below the top of the feed ducts as shown in Fig. 1. The taps 77 are then operated and the liquid flows into the receptacle placed beneath the funnels 85 as shown in Fig. 2.

More than one vessel 56 may be employed where the area of the vessel 62 is great or the vessel 56 may have more than one discharging funnel.

The gearing shown in Figs. 1 and 2 for operating the frame 7 and chamber 75 consists of a rack 88 fixed to a vertical member 89 of the frame 44.

A toothed wheel 90 fixed upon a horizontal spindle 91 engages the rack 88. Another toothed wheel 95 also fixed upon the spindle 91 is rotated by a screw gear 92 fixed upon an operating spindle 93, which is rotated by a hand wheel 94.

The platform 24 has a vertical member 25 sliding in guides fixed to the frame 8. A horizontal rod 48 provided with a handle 49 rotates a threaded vertical spindle 47 by means of bevel gears 50. This threaded rod is journaled in the framing 8 and passes through a nut 51 fixed to the vertical member 25 of the platform. Upon operating the handle 49 the spindle 47 is rotated and the platform caused to move up or down as desired.

The taps (see Figs. 5 and 6) comprise casings 27 and plugs 16 consisting of disk ends or flanges 29 and 30 united by a web 31 which is sufficient to close the discharge opening of the tap as clearly shown in Fig. 6; but when the plug is rotated a free passage is allowed through the casing 27 without diminishing the internal holding capacity of the casing.

What I claim is:

1. In a machine of the class described, a receiving chamber, a vessel having a delivery into the bottom of said receiving chamber; pipes leading from said receiving chamber at a higher level than the discharge of said vessel, means for controlling the supply to said vessel, a chamber into which said pipes depend to near the bottom thereof, measuring compartments located within said chamber, means whereby liquid after flowing from said pipes flows into said measuring compartments; and means for delivering the liquid from said measuring compartments, substantially as set forth.

2. In a machine of the kind described, a receiving chamber, a vessel having a delivery into the bottom of said receiving chamber, pipes leading from said receiving chamber at a higher level than the discharge of said vessel for controlling the supply to said vessel, said pipes all leading from said vessel at the same height, a chamber into which said pipes depend whereby liquid is discharged below the level of the liquid already standing therein, measuring compartments located within said chamber, means whereby liquid after flowing from said pipes flows into said measuring compartments; and means for delivering said liquid from said measuring compartments, substantially as set forth.

3. In a machine of the kind described, a receiving chamber, a vessel having a delivery into the bottom of said receiving chamber, pipes leading from said receiving chamber at a higher level than the discharge of said vessel, means for controlling the supply to said vessel, a movable chamber into which said pipes depend, measuring compartments within said movable chamber whose capacity is determined by the position of said movable chamber, means whereby the liquid flows from said movable chamber into said measuring compartments, and means for delivering the liquid from said measuring compartments, substantially as set forth.

4. In a machine of the class described, a receiving chamber; a vessel having a delivery into the bottom of said receiving chamber; pipes leading from said receiving chamber at a higher level than the discharge of said vessel, a movable chamber into which said pipes depend, a series of cylinders within said movable chamber, a series of plungers fitted to said receiving chamber and adapted to fit into a corresponding series of said cylinders within said movable chamber, means whereby the liquid to be measured can flow into said cylinders, said cylinders being adapted to coöperate with the plungers to measure the quantity of liquid to be delivered, substantially as described.

5. In a machine of the class described, a receiving chamber, a vessel having a delivery into the bottom of said receiving chamber, pipes leading from said receiving chamber at a higher level than the discharge of said vessel, a movable chamber into which said pipes depend, a series of cylinders within said movable chamber, a series of plungers fitted to said receiving chamber and adapted to fit into a corresponding series of said cylinders, said cylinders being adapted to coöperate with the plungers to measure the quantity of liquid to be delivered, feed ducts leading from the bottom of said cylinders to near the top thereof whereby the liquid can flow into said cylinders, and means for allowing the air to pass therefrom whereby they are enabled to fill with liquid, substantially as described.

6. In a machine of the kind described, a receiving chamber, a vessel having a delivery into the bottom of said receiving chamber, pipes leading from said receiving chamber at a higher level than the discharge of said vessel, means for controlling the supply to said vessel, a movable chamber into which said pipes depend, measuring compartments within said movable chamber, whose capacity is determined by the position of said movable chamber, means whereby the liquid flows from said movable chamber into said measuring compartments, taps controlling the discharge from said measuring compartments, said taps being controlled by a common operating lever, substantially as described.

In witness whereof, I have signed my name to this specification in the presence of two subscribing witnesses.

E. J. FALKINER.

Witnesses:
E. P. O'DONNELL,
NORA MUIR.